(12) United States Patent
Funseth et al.

(10) Patent No.: US 8,919,676 B2
(45) Date of Patent: Dec. 30, 2014

(54) ARRANGEMENT FOR SWITCHING NOZZLES ON THE GO FOR CONTROLLING SPRAY RATE

(75) Inventors: Travis G. Funseth, Ankeny, IA (US); David S. Mercer, W Des Moines, IA (US); Richard A. Humpal, Ankeny, IA (US)

(73) Assignee: Deere & Company, Moline, IL (US)

( * ) Notice: Subject to any disclaimer, the term of this patent is extended or adjusted under 35 U.S.C. 154(b) by 418 days.

(21) Appl. No.: 13/333,178

(22) Filed: Dec. 21, 2011

(65) Prior Publication Data
US 2013/0161419 A1 Jun. 27, 2013

(51) Int. Cl.
| | | |
|---|---|---|
| B05B 1/32 | (2006.01) | |
| B05B 1/16 | (2006.01) | |
| B05B 1/20 | (2006.01) | |
| B05B 1/14 | (2006.01) | |
| F16K 11/074 | (2006.01) | |

(52) U.S. Cl.
USPC ............. 239/540; 239/69; 239/170; 239/396; 239/443; 239/444; 239/446; 239/551; 239/563; 239/581.1; 137/625.15

(58) Field of Classification Search
USPC ................. 239/66, 67, 69, 99, 100, 159, 164, 239/263.1, 390, 396, 436, 443, 444, 446, 239/538, 540, 550, 551, 561–563, 569, 239/581.1, 170; 137/625.12, 625.15, 137/625.42; 251/129.11
See application file for complete search history.

(56) References Cited

U.S. PATENT DOCUMENTS

| | | | |
|---|---|---|---|
| 4,058,260 A | | 11/1977 | Lestradet |
| 5,312,045 A | * | 5/1994 | Johnston ......................... 239/74 |
| 5,913,329 A | | 6/1999 | Haynes et al. |
| 6,142,084 A | * | 11/2000 | Hatlo ............................ 111/127 |
| 6,598,851 B2 | * | 7/2003 | Schiavone et al. ........ 251/129.11 |
| 7,124,964 B2 | | 10/2006 | Bui |
| 7,861,946 B2 | | 1/2011 | Beeren |
| 2002/0092928 A1 | | 7/2002 | Conroy |
| 2009/0184182 A1 | * | 7/2009 | Beeren ....................... 239/581.1 |
| 2010/0288855 A1 | | 11/2010 | Lev |
| 2012/0187219 A1 | * | 7/2012 | Criscione, II et al. ........ 239/436 |

OTHER PUBLICATIONS

European Search Report, dated Apr. 29, 2013 (4 pages).
Communication under Rule 71(3) EPC, issued in counterpart European application No. 12195868.0, dated Aug. 27, 2014 (23 pages).

* cited by examiner

*Primary Examiner* — Darren W Gorman

(57) ABSTRACT

An agricultural sprayer includes a spray boom equipped with a plurality of spray heads, with each head having a body defining a cavity located in fluid communication with a fluid inlet and an array of four outlets leading to four nozzles respectively having different flow rates. A nozzle-select control member is mounted for rotation in the cavity and includes a fluid passage arrangement for establishing fluid connections between the inlet and different ones or combinations of the four nozzles as the control member is rotated among preselected discrete positions by an electric stepper motor, with the stepper motor being controlled in response to vehicle speed so that the spray tip capacity decreases for effecting a constant application rate as the vehicle speed decreases from a maximum permitted speed.

20 Claims, 14 Drawing Sheets

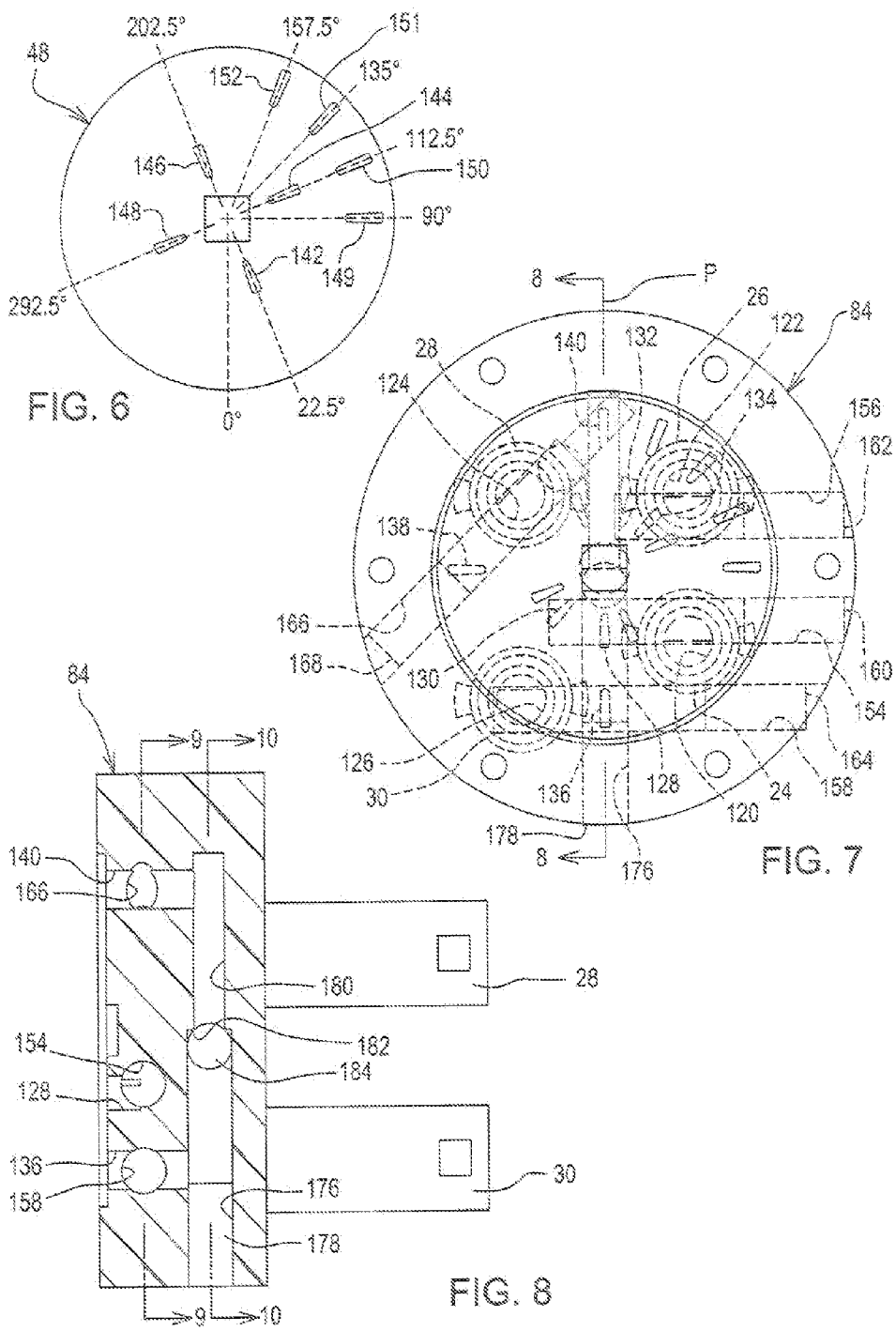

Figure 1:
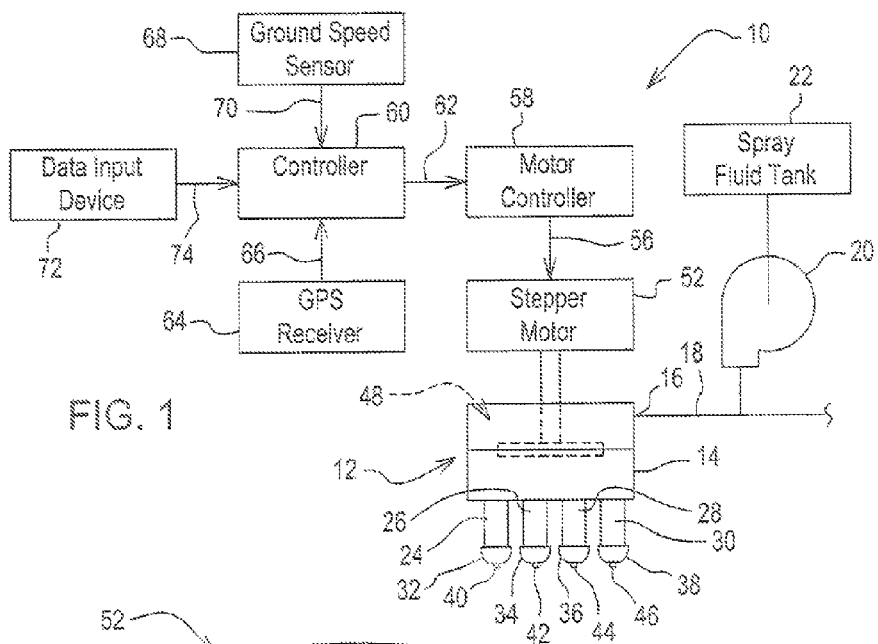

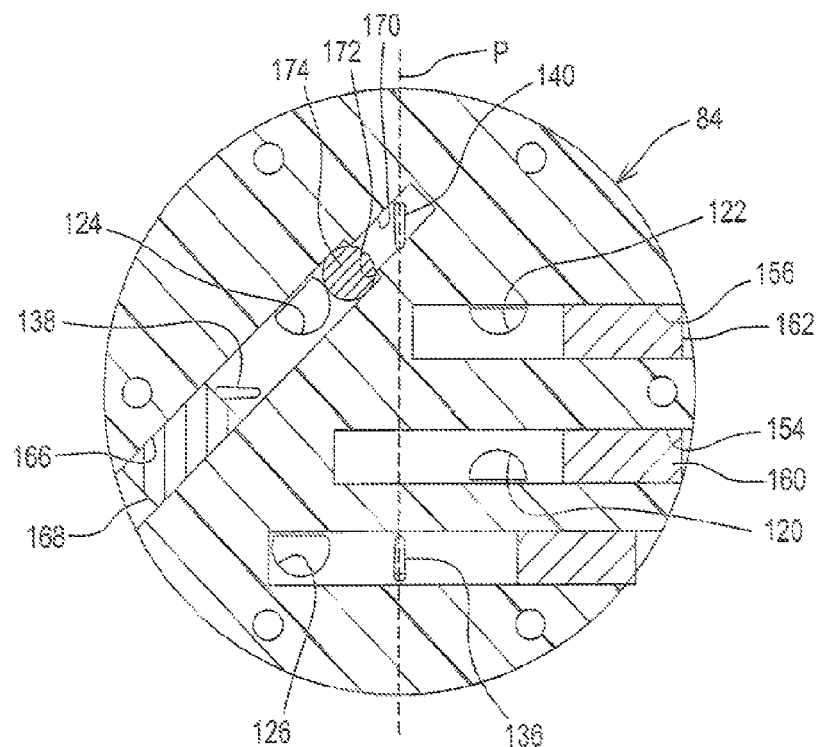
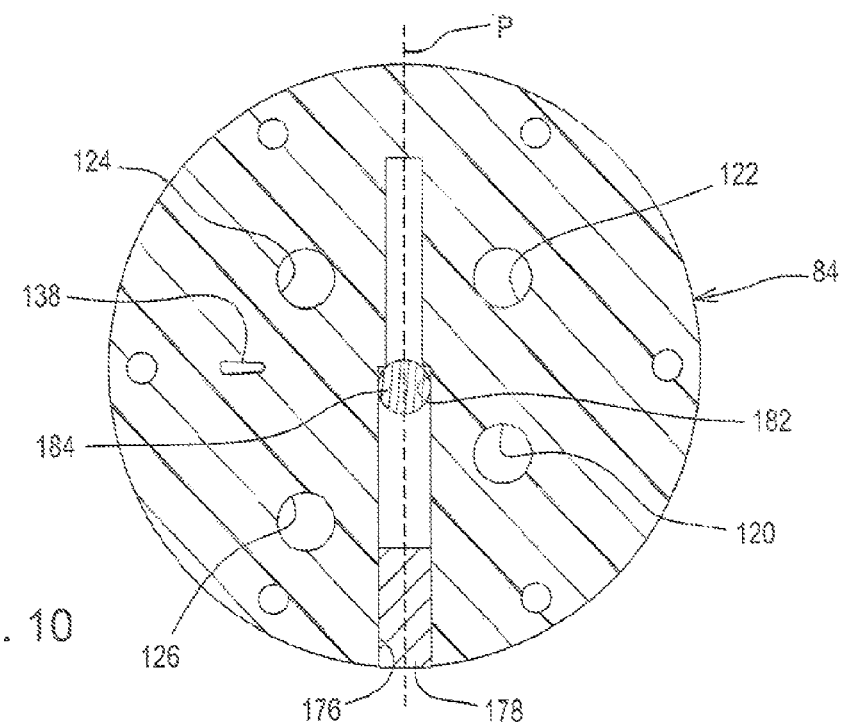

| Selector Disk Position | Disk Angle of Rotation (Degrees) | Outlet # | | | | Sum of Outlet Spray Rates (GPM) |
|---|---|---|---|---|---|---|
| | | 120 | 122 | 126 | 124 | |
| | | Nozzle & Spray Tip Capacity | | | | |
| | | 32 / 1 | 34 / 2 | 38 / 4 | 36 / 8 | |
| 0 | 0 | | | | | 0 |
| 1 | 22.5 | 1 | | | | 1 |
| 2 | 45 | | 2 | | | 2 |
| 3 | 67.5 | 1 | 2 | | | 3 |
| 4 | 90 | | | 4 | | 4 |
| 5 | 112.5 | 1 | | 4 | | 5 |
| 6 | 135 | | 2 | 4 | | 6 |
| 7 | 157.5 | 1 | 2 | 4 | | 7 |
| 8 | 180 | | | | 8 | 8 |
| 9 | 202.5 | 1 | | | 8 | 9 |
| 10 | 225 | | 2 | | 8 | 10 |
| 11 | 247.5 | 1 | 2 | | 8 | 11 |
| 12 | 270 | | | 4 | 8 | 12 |
| 13 | 292.5 | 1 | | 4 | 8 | 13 |
| 14 | 315 | | 2 | 4 | 8 | 14 |
| 15 | 337.5 | 1 | 2 | 4 | 8 | 15 |
| 16 | 360 | | | | | 0 |

FIG. 11

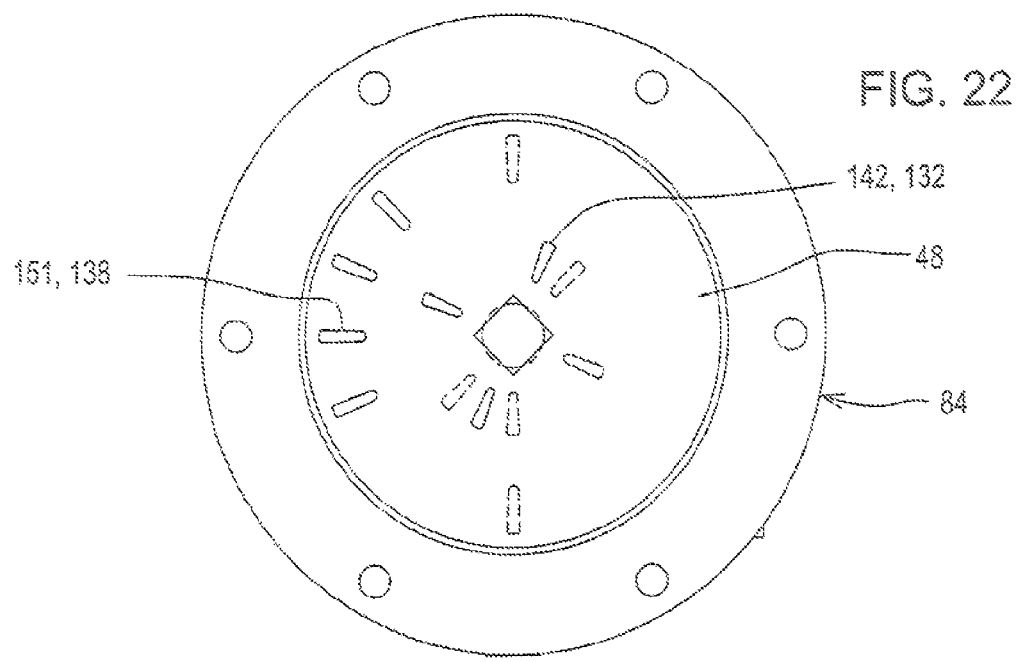
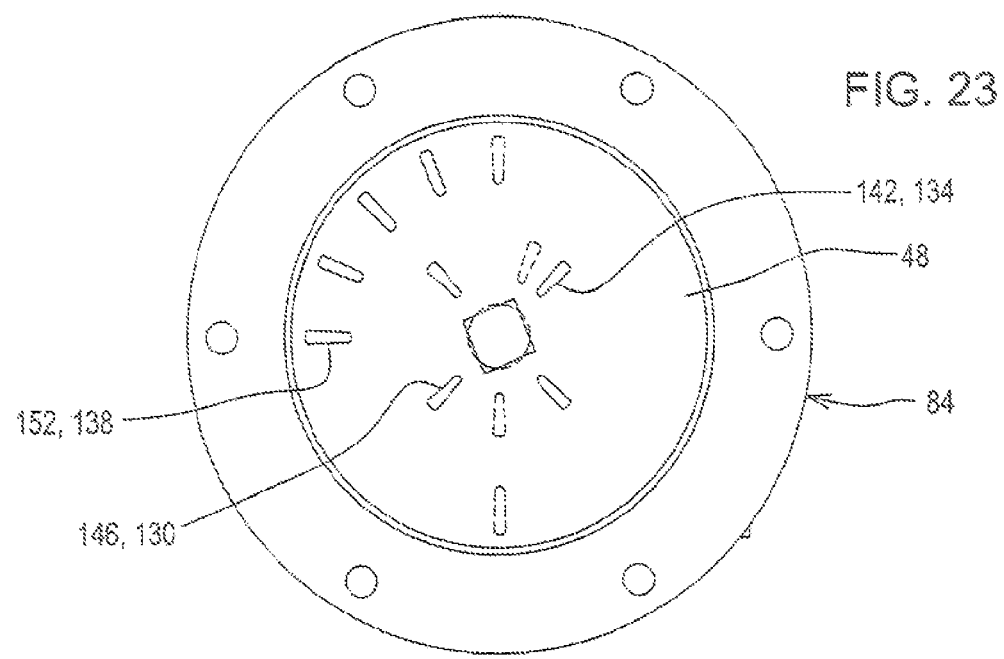

US 8,919,676 B2

ARRANGEMENT FOR SWITCHING NOZZLES ON THE GO FOR CONTROLLING SPRAY RATE

FIELD OF THE INVENTION

The present invention relates to agricultfural sprayers, and more specifically relates to automatically controlling the spray rate from a spray head for compensating for changes in vehicle ground speed so as to maintain a constant application rate.

BACKGROUND OF THE INVENTION

Agricultural sprayers use nozzles for spraying a liquid which may be a fertilizer, a pesticide, a fungicide, or an insecticide, for example, onto agricultural crops. Traditional nozzles consist of an orifice with geometry controlling the flow rate, droplet size and spray pattern to the target. The flow rate through the orifice is mainly a function of the orifice area and geometry as well as the fluid pressure at the orifice (i.e., pressure just prior to the orifice). Since the orifice size is fixed, i.e., the orifice geometry doesn't change, the most common way to influence the flow rate through the nozzle is by changing pressure.

Changing the fluid pressure at the nozzle to influence flow rate changes has become common place on sprayers in order to allow for variable vehicle speed. Systems change the flow rate proportional to the vehicle speed in order to keep the application rate the same.

However, using the traditional fixed orifice nozzle has some limitations. The pressure versus flow relationship is a squared function. To double the flow requires increasing the pressure by a factor of four times. Unfortunately, changing pressure also changes atomization dynamics resulting in an impact on spray quality. Spray quality characteristics, namely, droplet size and the spray angle, both become smaller as pressure increases. These changes can negatively impact to spray deposit and spray drift. So, the need for a variable rate nozzle with uniform pressure has emerged.

U.S. Pat. No. 7,124,964 discloses a nozzle arrangement including a flexible spray tip which may be manipulated by a driven metering member which acts to selectively change the spray tip configuration in response to changes in vehicle speed so as to change the spray tip spray rate for maintaining a desired application rate. This nozzle arrangement has the disadvantage of requiring a specialized nozzle construction instead of less costly standard nozzle configurations.

SUMMARY OF THE INVENTION

According to the present invention, there is provided a novel spray head including a nozzle arrangement for maintaining a desired application rate.

An object of the invention is to provide a spray head nozzle arrangement which automatically maintains a desired constant spray fluid application rate during changes in sprayer vehicle ground speed and which overcomes the above-noted disadvantages of the patented nozzle arrangement while maintaining the advantage of permitting the spray fluid to be supplied to the spray head nozzle arrangement at a constant pressure.

This object is achieved by a spray head nozzle arrangement including a manifold body defining a cavity connected in fluid communication with a spray fluid inlet arrangement and a spray fluid outlet arrangement, with the outlet arrangement defining a plurality of passages having entrances defined as slots located in one or more circular patterns about an upright axis of rotation of a nozzle selector disk containing a plurality of slots located for being rotated into register with one or more of the entrance slots of the outlet arrangement, with the outlet arrangement leading to a plurality of standard nozzles carried by the body and respectively having spray tips designed for having different spray rates for a given pressure of the supplied spray fluid, whereby different spray rates are obtained by rotating the nozzle selector disk to different positions by a drive motor, with the drive motor being automatically controlled to rotate the nozzle selector disk to select one or more nozzles for effecting a spray rate corresponding to the spray vehicle speed so as to maintain a constant spray fluid application rate.

This and other objects of the invention will become apparent from a reading of the ensuing description together with the appended drawings.

BRIEF DESCRIPTION OF THE DRAWINGS

FIG. 1 is a schematic showing a control system for automatically switching liquid spray fluid among a plurality of nozzles of a spray head for controlling the spray rate so as to maintain a constant application rate with varying travel speeds of the spray vehicle.

FIG. 2 is a perspective view of a spray head including a switchable nozzle arrangement constructed in accordance with the present invention, but with the nozzles being removed from the nozzle connectors for the sake of simplicity.

FIG. 3 is a vertical sectional view taken through the spray head of FIG. 2 along a first plane passing through the inlet and a second plane passing through one of the four outlets, with the planes meeting at an axis of rotation of the nozzle selector disk of the nozzle arrangement.

FIG. 4 is a bottom view of the spray head shown in FIG. 2.

FIG. 5 is a top view of the flow direction control section of the nozzle arrangement shown in FIG. 2.

FIG. 6 is a top view of the nozzle selector disk shown in FIG. 2.

FIG. 7 is a horizontal sectional view taken through the flow direction control manifold body just above the lower flow direction control section of FIG. 2 and looking downwardly and showing the fluid passage arrangement used to convey fluid from the flow direction selector slots of the selector disk to the four outlets leading to the nozzle connectors.

FIG. 8 is a vertical sectional view taken through the lower flow direction control section of the manifold body along the lines 8-8 of FIG. 7, but with the lower portion of the upper inlet section and nozzle selector disk being removed for the sake of simplicity.

FIG. 9 is a horizontal sectional view taken through the manifold body along the lines 9-9 of FIG. 8, but showing the entire manifold body.

FIG. 10 is a horizontal sectional view taken through the manifold body along the lines 9-9 of FIG. 7, but showing the entire manifold body.

FIG. 11 is a table showing the application rates achievable for each of the sixteen different selected positions of a nozzle selector disk.

FIGS. 12-27, respectively, illustrate sixteen positions of a nozzle selector disk for achieving each of sixteen spray rates from a spray head.

DESCRIPTION OF THE PREFERRED EMBODIMENT

Referring now to FIG. 1, there is shown a schematic of a control system 10 for maintaining the application rate of an agricultural spray to a field substantially constant at different sprayer vehicle ground speeds. The control system 10 comprises a plurality of spray heads 12 (only one shown) which would be mounted in evenly spaced relationship to each other along the length of a sprayer boom (not shown). Each of the spray heads 12 includes a manifold body 14 having an inlet 16 coupled for receiving spray fluid from a supply tube 18 carried by the spray boom and coupled to an outlet of a supply pump 20 having an inlet coupled to a source of spray fluid contained within a spray fluid tank 22 carried by the sprayer vehicle. Four cylindrical, tubular nozzle connectors 24, 26, 28 and 30 (shown other than in actual locations of mounting for the sake of clarity), respectively, include upper ends secured to a lower surface of the manifold body 14 in fluid communication with four outlet openings, described below. Four conventional spray nozzles 32, 34, 36 and 38 are respectively coupled to lower ends of the connectors 24, 26, 28 and 30 by bayonet connections, for example, and respectively include spray tips 40, 42, 44 and 46 having different flow rates for a given spray fluid supply pressure. Instead of being configured for being mounted to the bottom of the connectors 24, 26, 28 and 30, the manifold body and nozzles could be configured in any other suitable way to establish a connection of the nozzles with the four outlet openings, for example, the nozzles could be snap fit or threaded to the manifold body.

A flow control valve is defined by a circular nozzle selector disk 48 and the manifold body 14 with the nozzle selector disk 48 being located within the manifold body 14 at a location between the inlet 16 and a flow direction control passage arrangement (described below) and is mounted for rotation about an upright axis of rotation. The flow direction control passage arrangement includes a plurality of slots (described below), which lead to and cooperate with passage ways (also described below) to define an outlet passage arrangement which lead to one or more of the nozzle connectors 24-30, and hence to one or more of the spray nozzles 32-38.

The nozzle selector disk 48 is selectively positioned by automatic operation of a power-operated motor, which may be an electrically controlled pneumatic, hydraulic or electric motor, but is preferably an electrically powered stepper motor 52 mounted to a central location of a top surface of the manifold body 14 and has an output shaft 54 coupled, in a manner described in more detail below, to a central location of the nozzle selector disk 48. The motor 52 is electrically coupled, as by a motor control signal lead 56, for receiving electrical control pulses from a motor controller 58 as commanded by an electronic controller 60 coupled to the motor controller 56 by an output signal lead 62. The electronic controller 60 may be a microprocessor having a memory into which field mapping data, for example, relating to potential yield, soil type, soil nutrients, soil moisture content, weeds, diseases, and field topography, may be stored along with corresponding spray fluid application rates. To go along with this mapping data, a GPS receiver 64 is coupled to the controller by a position input signal lead 66. Also stored in the memory of the controller 60 is a look-up table containing data relating application rates of the nozzle tips 40-46 to ground speed of the spray vehicle. To go along with this data, a spray vehicle ground speed sensor 68 is coupled to the controller 60 by a ground speed input signal lead 70. The type of spraying being done and the corresponding nozzle tips being used can be keyed into the memory of the controller 60 by a manually-operable data input device 72 that is coupled to the controller by a data input lead 74.

Figure 2:
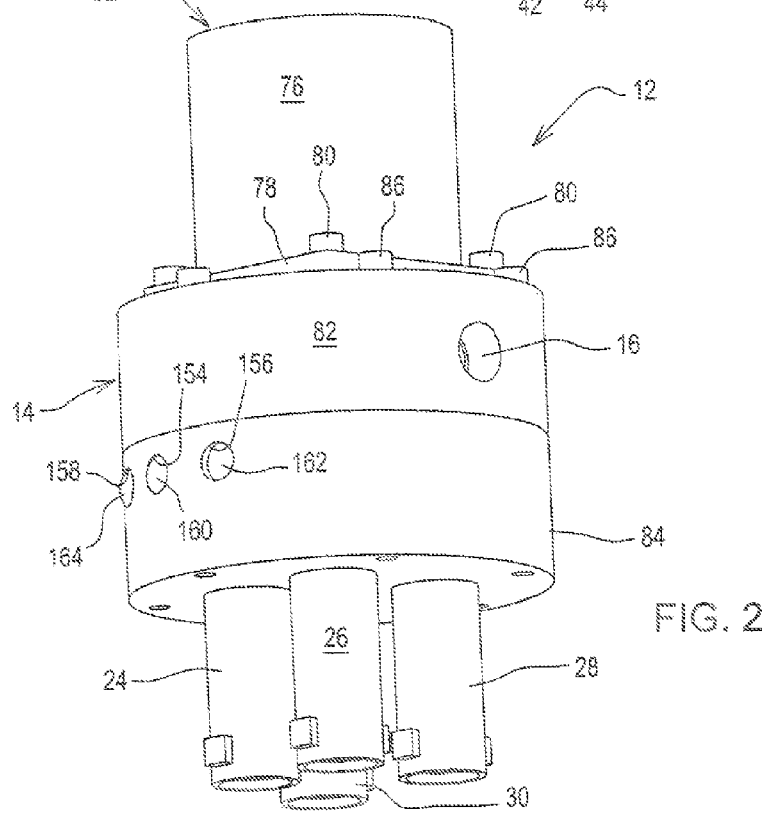
Figure 3:
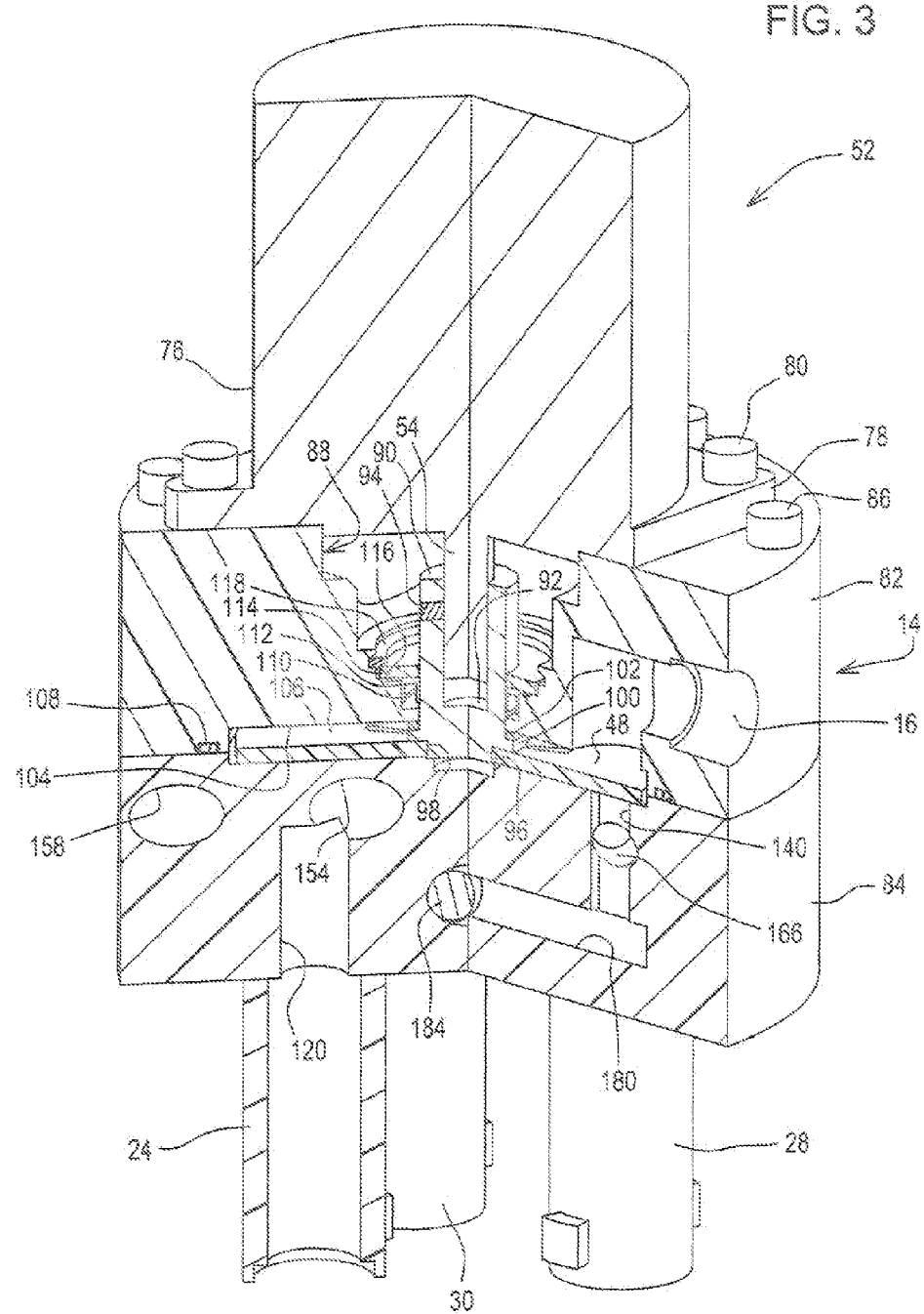

Referring now to FIGS. 2 and 3, there is shown the spray head 12 of FIG. 1, but with the nozzles 32-38 and associated spray tips being omitted for the sake of clarity. It can be seen that the stepper motor 52 includes a cylindrical housing 76 provided at its lower end with a horizontal mounting flange arrangement 78 secured against a top surface of the manifold body 14 by screw fasteners 80. Also, it can be seen that the manifold body 14 includes an upper cylindrical spray fluid inlet section 82 and a lower cylindrical spray fluid outlet section 84, the sections 82 and 84 being clamped together by a plurality of bolt and nut combinations 86 arranged in a circular pattern. It is to be understood that, instead of the nut and bolt combinations 86, the manifold body sections 82 may be secured together in any other suitable fashion including threaded or interlocking connections, for example.

Figure 4:
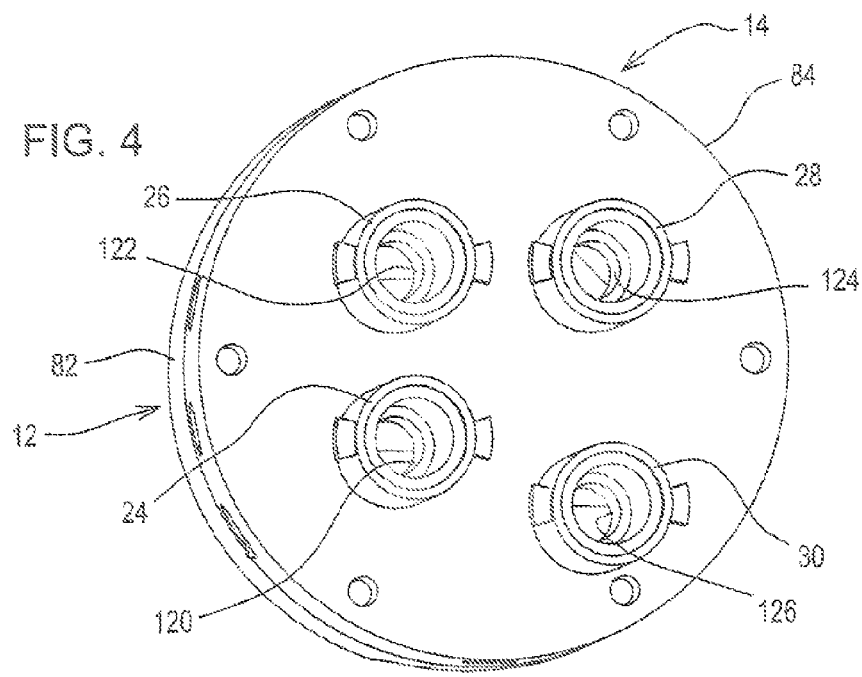

As can best be seen in FIG. 3, a central location of the inlet section 82 of the manifold body 14 is provided with a stepped cylindrical through bore 88. The output shaft 54 of the stepper motor 52 is disposed along a central axis of the bore 88 and is connected to the nozzle selector disk 48 by a shaft coupler 90 having a blind bore 92 extending axially from an upper end of the coupler and receiving the output shaft 54, with the coupler 90 being secured for rotation with the shaft 54 by being keyed or having a splined connection (not shown) in a well known manner and being axially secured by a setscrew 94. A lower end section 96 of the shaft coupler has a non-round cross-section, which may be square or round with a flat, for example, received in a complementary shaped opening 98 located at the axial center of the disk 48. The coupler 90 further includes an annular flange 100 engaging a top surface of the nozzle selector disk 48. One or more shims 102 is (are) located on a top side of the flange 100 and takes up any space between a top surface 104 of an annular fluid chamber 106 defined by a circular recess formed in the bottom of the inlet section 82 and the top of the outlet section 84 of the manifold body 14, the chamber 106 being in fluid communication with the spray fluid inlet 16 and extending over the top of the nozzle selector disk 48. Leakage of spray fluid from the chamber 106 along a flat interface established between the inlet section 82 and the outlet section 84 of the manifold body 14 is prevented by an o-ring seal 108 located in an annular seal groove provided in the underside of the inlet section 82 outwardly of the chamber 106. Leakage of fluid along an annular interface between the shaft coupler 90 and the surface of through bore 88 is prevented by a low friction, annular shaft seal 110 located in an annular seal receptacle 112 defined by the through bore 88. An annular seal retainer plate 114 engages a top surface of the shaft seal 110 and is supported on an annular step surface 116 defined by through bore 88. The retainer plate 114 is held in place by a snap ring 118 that is received in an annular snap ring groove provided in a surrounding wall region of the through bore 88. Referring now also to FIG. 4, it can be seen that the bottom of the outlet section 84 of the manifold body 14 includes outlets 120, 122, 124 and 126, respectively, axially aligned with the tubular nozzle connectors 24, 26, 28 and 30.

Figure 5:
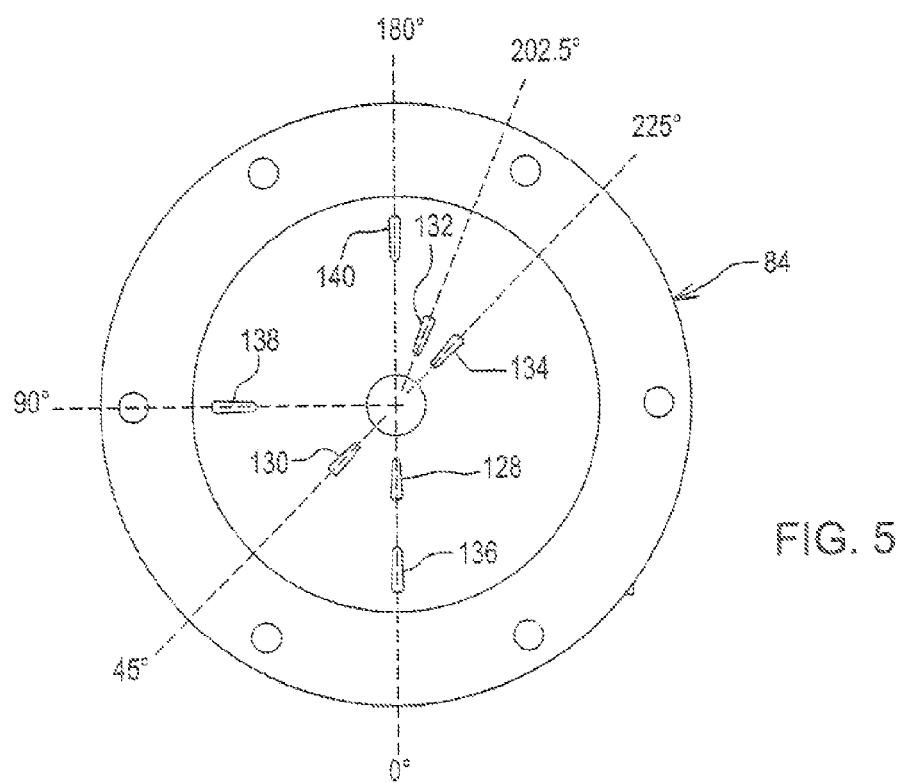

Referring now to FIG. 5, it can be seen that the outlet section 84 of the manifold 14 contains an arrangement of flow control slots. Considering a vertical line through the center of the plate to be the loci of a 0° position at the bottom of the outlet section 84 and a 180° position at the top of the section 84, then, proceeding clockwise, first, second, third and fourth flow control slots 128, 130, 132 and 134, respectively, are angularly spaced from each other about the axis of the outlet section 84 in an inner ring or circular arrangement of locations at 0°, 45°, 202.5° and 225°, while fifth, sixth, seventh and eighth flow control slots 136, 138 and 140, respectively, are angularly spaced from each other in an outer ring or circular arrangement of locations at 0°, 90° and 180°.

Referring now to FIG. 6, it can be seen that the nozzle selector disk 48 contains an arrangement of nozzle selector slots. Assuming that the disk 48 is rotated in a clockwise direction for sequencing between positions for effecting increasing spray rates from the spray head 12, the position illustrated is that for preventing flow to all of the flow control slots of the outlet section 84. In this zero flow or "off" position, first, second, third and fourth nozzle selector slots 142, 144, 146 and 148, respectively, are angularly spaced counterclockwise from each other about the axis of the disk 48 in an inner ring of locations which lead the 0° location of the outlet section 84 of the manifold 14 by respective angles of 22.5°, 112.5°, 202.5° and 292.5°, while fifth, sixth, seventh and eighth nozzle selector slots 149, 150, 151 and 152, respectively, are angularly spaced clockwise from each other in an outer ring of locations which lead the 0° location of the control plate 50 by respective angles of 90°, 112.5°, 135° and 157.5°.

Referring now back to FIG. 2 and also to FIGS. 7 and 8, it can be seen that the outlet section 84 of the manifold body 14 includes first, second, and third horizontal, parallel blind bores 154, 156 and 158, respectively, extending horizontally from a right side, upper level region of the outlet section 84 and making right angles with a vertical plane P passing through the center of the section 84, with the outlets 120 and 122 being located to one side of the plane P and with the outlets 124 and 126 being located on the other side of the plane P. As can best be seen in FIG. 9, the blind bores 154, 156 and 158, respectively, have right end portions sealed by first, second and third threaded plugs 160, 162 and 164, respectively. The blind bores 154, 156 and 158 intersect respective upper end regions of the spray fluid outlets 120, 122, and 126 which each extend vertically in the lower section 84 of the manifold body 14. A fourth horizontal blind bore 166 is also located in the upper level of the outlet section 84 of the manifold body 14, the bore 166 intersecting an upper end region of the spray fluid outlet 124 and being oriented so as to intersect and traverse the plane P, with the bore 166 making an angle of approximately 45° with the plane P. A left end portion of the blind bore 166 is provided with a fourth threaded plug 168. The blind bore 166 includes a reduced diameter section 170 beginning at a location between where the bore 166 intersects the flow control outlet 124 and the plane P resulting in an annular shoulder being formed which defines a valve seat 172 for a one-way check valve ball 174 having a purpose discussed below. Referring now also to FIG. 10, it can be seen that a fifth horizontal blind bore 176 is located at a second level in the lower manifold body section 84 which is below the first level in which the bores 154, 156, 158 and 166 are located, with the blind bore 176 being centered along the plane P, with an end region of the bore 176 being disposed vertically beneath an end region of the fourth bore 166 which traverses the plane P. As viewed in FIG. 7, a bottom end portion of the bore contains a threaded plug 178. The bore 176 is stepped so as to have a reduced diameter upper end section 180 resulting in a shoulder which defines a valve seat 182 for a one-way check valve ball 184 having a purpose discussed below.

As can best be seen in FIGS. 7, 8 and 9, of the four flow direction control slots 128, 130, 132 and 134 making up the inner ring of flow control slots of the outlet section 84, the slots 128 and 130 are both in fluid communication with the blind bore 154, and hence the outlet 120, while the slots 132 and 134 are both in fluid communication with the blind bore 156, and hence with the outlet 122. The three flow control slots 136, 138 and 140, which make up the outer ring of flow control slots, extend vertically in the outlet section 84, with the slot 136 intersecting the blind bores 158 and 176, the slot 138 intersecting the large diameter section of the blind bore 166, and with the slot 140 intersecting the reduced diameter sections 170 and 180 respectively of the blind bores 166 and 176. Thus, the slot 136 is in fluid communication with the outlet 126, noting that the check ball 184 prevents flow to any other outlet, the slot 138 is connected in fluid communication with the outlet 124, noting that the check ball 174 prevents flow to any other outlet, and the slot 140 is coupled in fluid communication with both outlets 124 and 126, noting that the check ball 184 permits flow to the outlet 126 by way of the bore 176, slot 136 and bore 158.

Referring now to FIG. 11, there is shown a table correlating sixteen selection positions of the nozzle selector disk 48 which are respectively attained by indexing the selector disk 48 clockwise through 22.5° increments from the 0 or "off" position shown in FIG. 6. Also listed is four nozzle spray rates of 1, 2, 4 and 8 gallons per minute (GPM) respectively produced by the four tips 40, 42, 44 and 46 of the nozzles 32, 34, 36 and 38 respectively receiving fluid from the four outlets 120, 122, 124 and 126. A column is also provided indicating the sum of the outlet spray rates attained by each selector disk position, noting that the application rate in gallons per acre (GPA) for each selector disk position would depend upon the speed of travel of the sprayer vehicle.

Figure 12:
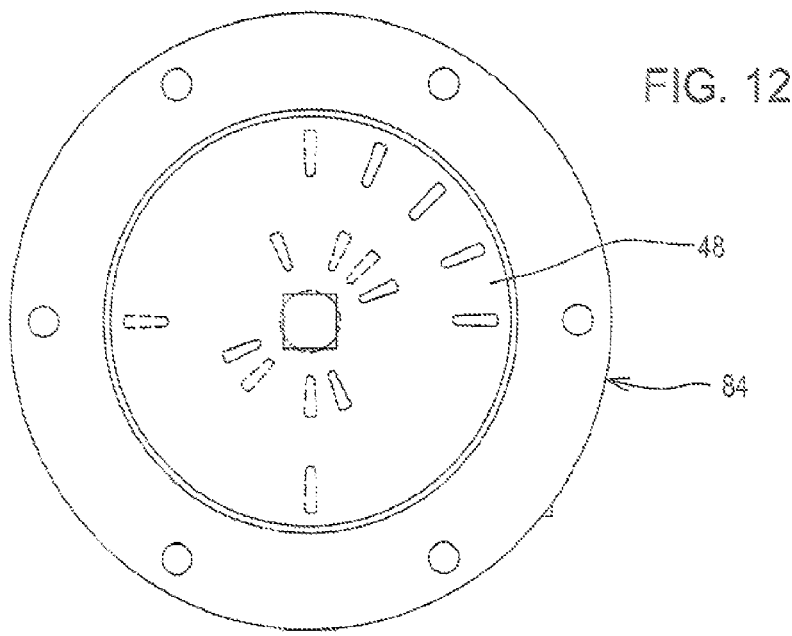

Accordingly, with the nozzle selector disk 48 in the 0 or "off" disk position the disk is in a disk angle of rotation of 0° wherein none of the flow direction control slots 128-140 at the top of the outlet section 84 of the manifold body 14 are selected, i.e., in alignment with any of the nozzle selection slots 142-152 of the selector disk 48. Consequently, the sum of the nozzle flow rates when the selector disk 48 is in the "off" position is 0 gallons per minute (GPM). This relationship between the selector disk 48 and outlet section 84 is illustrated in FIG. 12.

Figure 13:
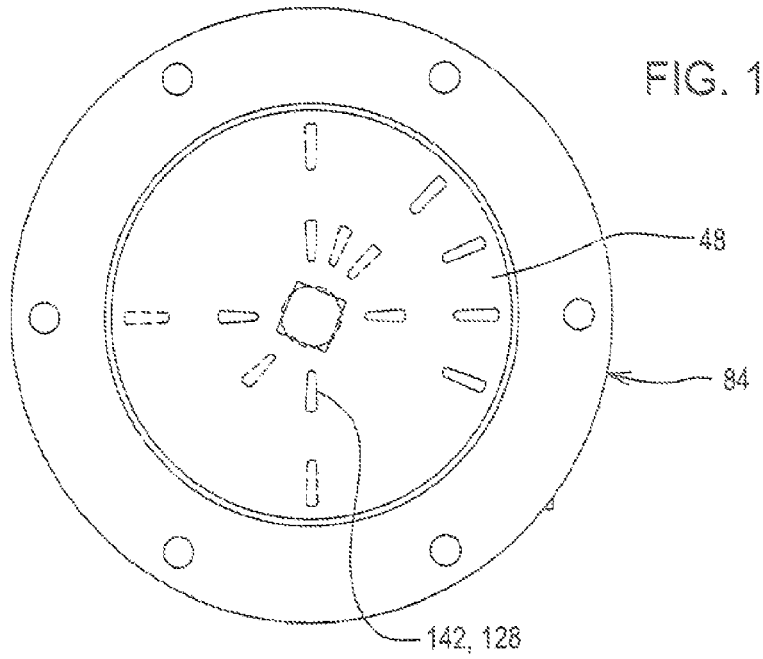

Position 1 of the selector disk 48 is achieved by indexing the selector disk 48 clockwise relative to the outlet section 84 through an angle of 22.5° from the 0° position, to the position illustrated in FIG. 13 wherein the selector slot 142 of the selector disk 48 is superposed over the flow control slot 128 of the outlet section 84 of the manifold body 14. As described above, the flow control slot 128 is coupled in fluid communication with the outlet 120 that supplies fluid to the nozzle 32, with the tip 40 of this nozzle having a spray rate of 1 GPM.

Figure 14:
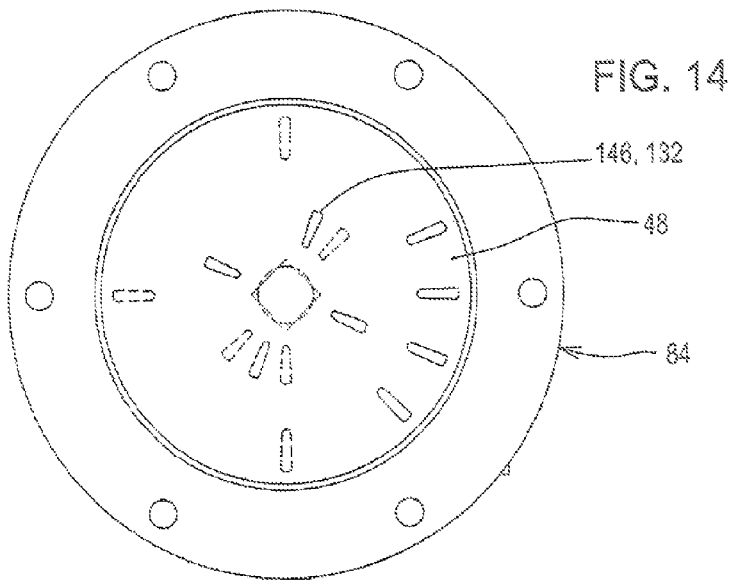

Position 2 of the selector disk 48 is achieved by indexing the selector disk 48 clockwise through an angle of 22.5° from the 22.5° position, to a 45° position illustrated in FIG. 14 wherein the selector slot 146 of the selector disk 48 is superposed over the flow control slot 132 of the outlet section 84 of the manifold body 14. As described above, the flow control slot 132 is coupled in fluid communication with the outlet 122 that supplies fluid to the nozzle 34, with the tip of this nozzle 42 having a spray rate of 2 GPM.

Figure 15:
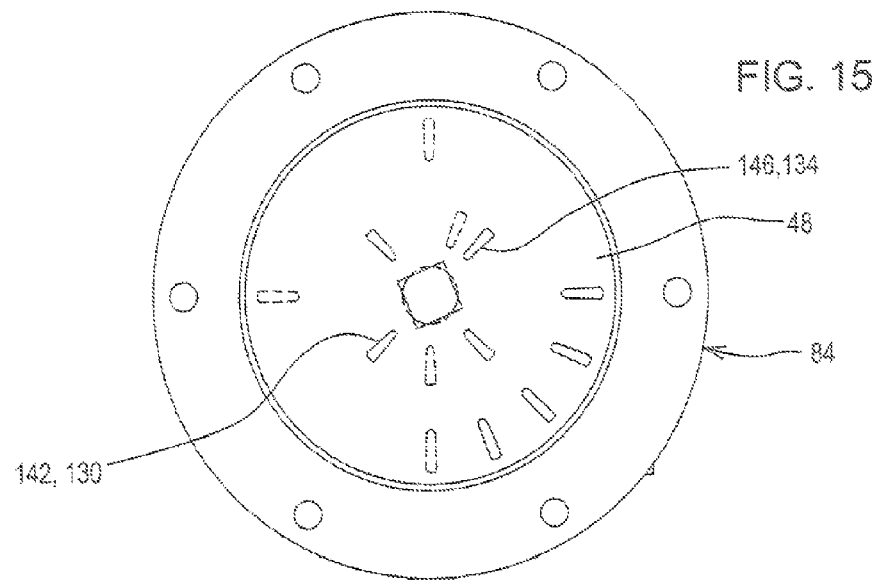

Position 3 of the selector disk 48 is achieved by indexing the selector disk 48 clockwise through an angle of 22.5° from the 45° position, to a 67.5° position illustrated in FIG. 15 wherein the selector slots 142 and 146 of the selector disk 48 are respectively superposed over the flow control slots 130 and 134 of the outlet section 84 of the manifold body 14. As described above, the flow control slot 130 is coupled in fluid communication with the outlet 120 that supplies fluid to the nozzle 32, this nozzle having the tip 40 having a spray rate of 1 GPM. The flow control slot 134 is coupled in fluid communication with the outlet 122 which is coupled to the nozzle 34, with the tip 42 of this nozzle having a spray rate of 2 GPM. Thus, the sum of the spray rates from the spray head 12 is 3 GPM.

Figure 16:
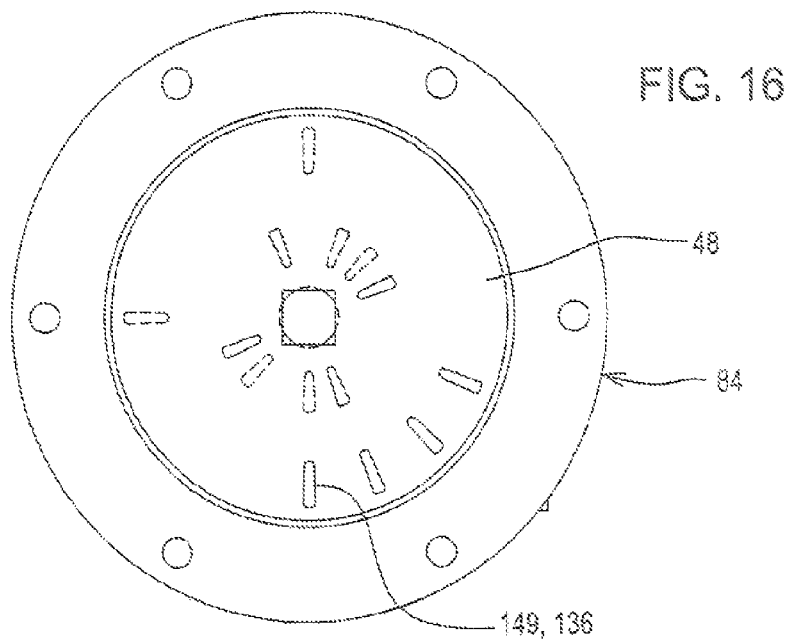

Position 4 of the selector disk 48 is achieved by indexing the selector disk 48 clockwise through an angle of 22.5° from the 67.5° position, to a 90° position illustrated in FIG. 16 wherein the selector slot 149 of the selector disk 48 is superposed over the flow control slot 136 of the outlet section 84 of the manifold body 14. As described above, the flow control slot 136 is coupled in fluid communication with the outlet 126 that supplies fluid to the nozzle 38, with the tip 46 of this nozzle having a spray rate of 4 GPM. Thus, the spray rate from the spray head 12 is 4 GPM.

Figure 17:
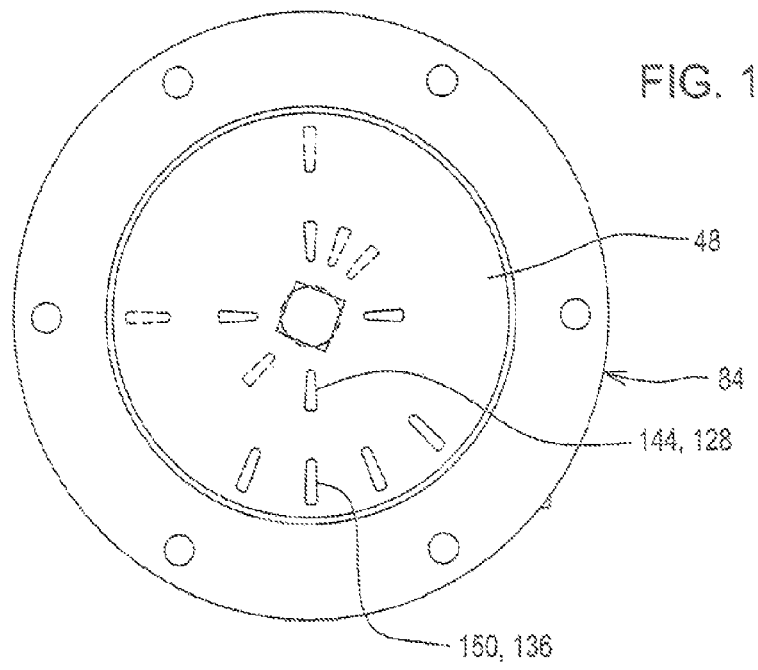

Position 5 of the selector disk 48 is achieved by indexing the selector disk 48 clockwise through an angle of 22.5° from the 90° position, to a 112.5° position illustrated in FIG. 17 wherein the selector slots 144 and 150 of the selector disk 48 are respectively superposed over the flow control slots 128 and 136 of the outlet section 84 of the manifold body 14. As described above, the flow control slot 128 is coupled in fluid communication with the outlet 120 that supplies fluid to the nozzle 32, with the tip 40 of this nozzle having a spray rate of 1 GPM, and the control slot 136 is coupled in fluid communication with the outlet 126 that supplies fluid to the nozzle 38, with the tip 46 of this nozzle having a spray rate of 4 GPM. Thus, the total spray rate from the spray head 12 is 5 GPM.

Figure 18:
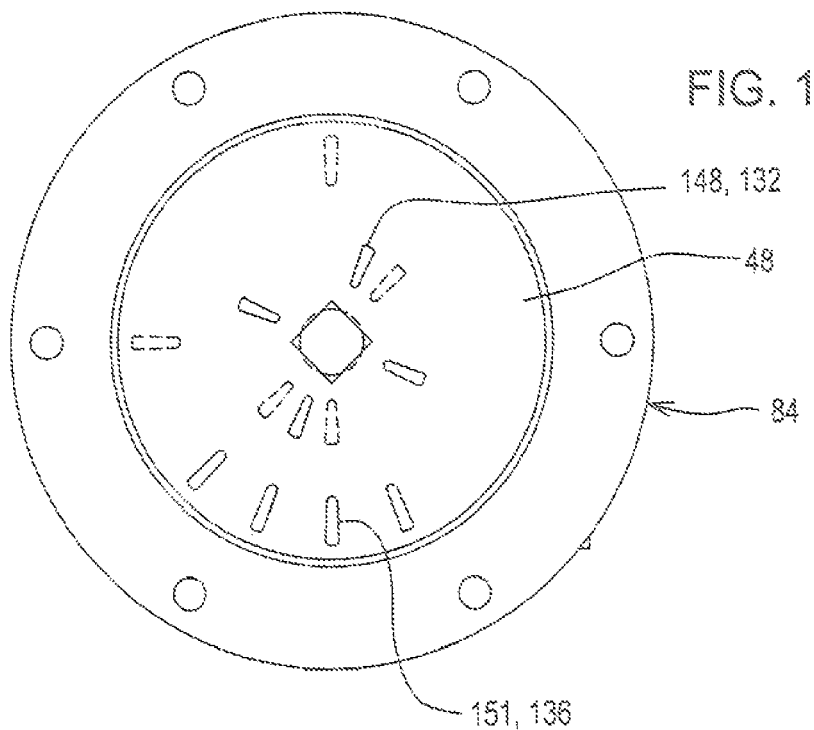

Position 6 of the selector disk 48 is achieved by indexing the selector disk 48 clockwise through an angle of 22.5° from the 112.5° to a 135° position illustrated in FIG. 18 wherein the selector slots 148 and 151 of the selector disk 48 are respectively superposed over the flow control slots 128 and 136 of the outlet section 84 of the manifold body 14. As described above, the flow control slot 128 is coupled in fluid communication with the outlet 122 that supplies fluid to the nozzle 34, with the tip 42 of this nozzle having a spray rate of 2 GPM, and the control slot 136 is coupled in fluid communication with the outlet 126 that supplies fluid to the nozzle 38, with the tip 46 of this nozzle having a spray rate of 4 GPM. Thus, the total spray rate from the spray head 12 is 6 GPM.

Figure 19:
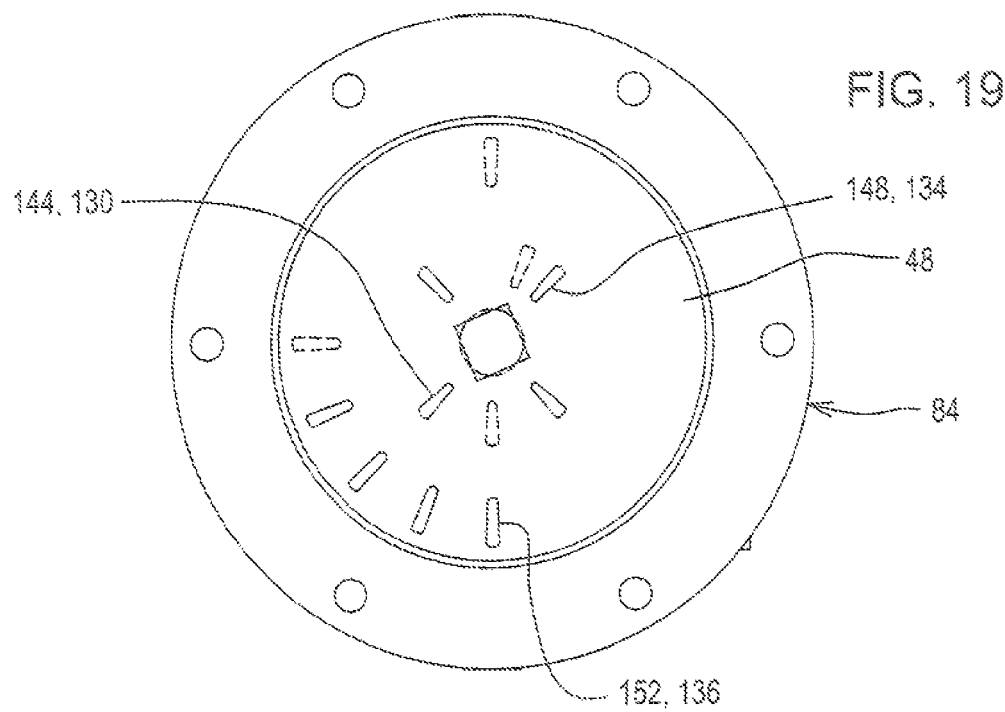

Position 7 of the selector disk 48 is achieved by indexing the selector disk 48 clockwise through an angle of 22.5° from the 135° position to a 157.5° position illustrated in FIG. 19 wherein the selector slots 144, 148 and 152 of the selector disk 48 are respectively superposed over the flow control slots 130, 134 and 136 of the outlet section 84 of the manifold body 14. As described above, the flow control slot 130 is coupled in fluid communication with the outlet 120 that supplies fluid to the nozzle 32, with the tip 40 of this nozzle having a spray rate of 1 GPM. The flow control slot 134 is coupled in fluid communication with the outlet 122 that supplies fluid to the 34, with the tip 42 of this nozzle having a spray rate of 2 GPM, and the control slot 136 is coupled in fluid communication with the outlet 126 that supplies fluid to the nozzle 38, with the tip 46 of this nozzle having a spray rate of 4 GPM, and the control slot 136 is coupled in fluid communication with the outlet 126 that supplies fluid to the nozzle 38, with the tip 46 of this nozzle having a spray rate of 4 GPM. Thus, the total spray rate from the spray head 12 is 7 GPM.

Figure 20:
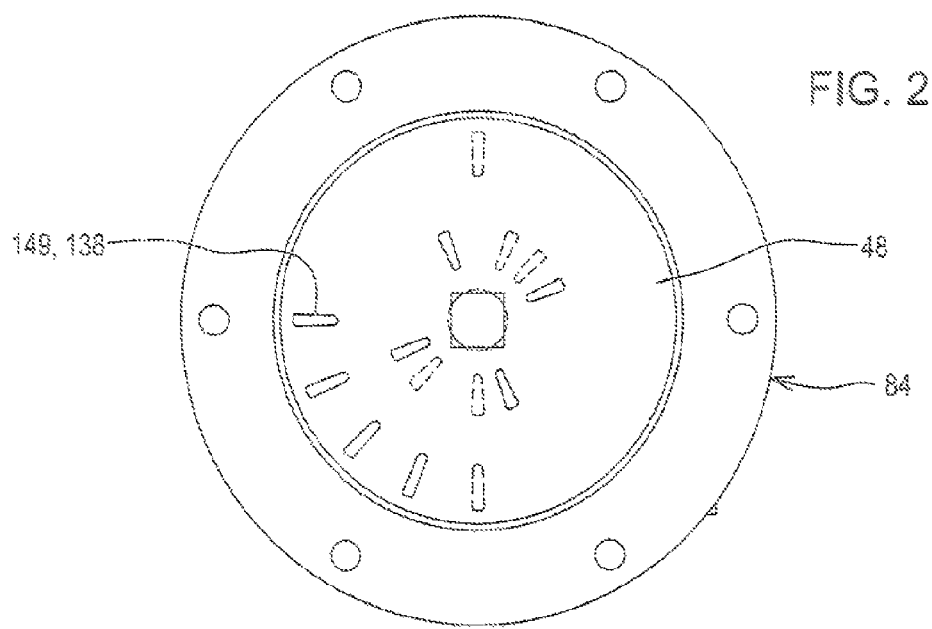

Position 8 of the selector disk 48 is achieved by indexing the selector disk 48 clockwise through an angle of 22.5° from the 157.5° position to an 180° position illustrated in FIG. 20 wherein the selector slot 149 of the selector disk 48 is superposed over the flow control slot 138 of the outlet section 84 of the manifold body 14. As described above, the flow control slot 138 is coupled in fluid communication with the outlet 124 that supplies fluid to the nozzle 38, with the tip 46 of this nozzle having a spray rate of 8 GPM. Thus, the total spray rate from the spray head 12 is 8 GPM.

Figure 21:
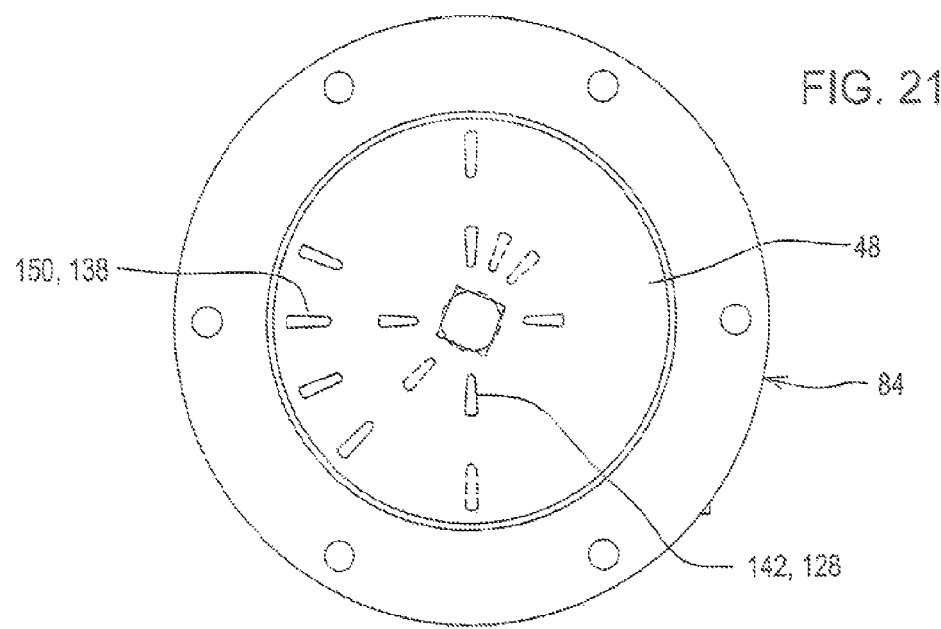

Position 9 of the selector disk 48 is achieved by indexing the selector disk 48 clockwise through an angle of 22.5° from the 180° position to a 202.5° position illustrated in FIG. 21 wherein the selector slots 142 and 150 of the selector disk 48 are respectively superposed over the flow control slots 128 and 138 of the outlet section 84 of the manifold body 14. As described above, the flow control slot 128 is coupled in fluid communication with the outlet 120 that supplies fluid to the nozzle 32 having the tip 40 which has a spray rate of 1 GPA, and the flow control slot 138 is coupled in fluid communication with the outlet 124 that supplies fluid to the nozzle 38, with the tip 46 of this nozzle having a spray rate of 8 GPM. Thus, the total spray rate from the spray head 12 is 9 GPM.

Position 10 of the selector disk 48 is achieved by indexing the selector disk 48 clockwise through an angle of 22.5° from the 202.5° position to a 225° position illustrated in FIG. 22 wherein the selector slots 142 and 151 of the selector disk 48 are respectively superposed over the flow control slots 132 and 138 of the outlet section 84 of the manifold body 14. As described above, the flow control slot 132 is coupled in fluid communication with the outlet 122 that supplies fluid to the nozzle 34 having the tip 42 which has a spray rate of 2 GPM, and the flow control slot 138 is coupled in fluid communication with the outlet 124 that supplies fluid to the nozzle 38, with the tip 46 of this nozzle having a spray rate of 8 GPM. Thus, the total spray rate from the spray head 12 is 10 GPM.

Position 11 of the selector disk 48 is achieved by indexing the selector disk 48 clockwise through an angle of 22.5° from the 225° position to a 247.5° position illustrated in FIG. 23 wherein the selector slots 142 and 146 and 152 of the selector disk 48 are respectively superposed over the flow control slots 134, 130 and 138 of the outlet section 84 of the manifold body 14. As described above, the flow control slot 134 is coupled in fluid communication with the outlet 122 that supplies fluid to the nozzle 34 having the tip 42 which has a spray rate of 2 GPM, the flow control slot 130 is in fluid communication with the outlet 120 that supplies fluid to the nozzle 32 having the tip 40 which has a spray rate of 1 GPM, and the 138 is coupled in fluid communication with the outlet 124 that supplies fluid to the nozzle 38, with the tip 46 of this nozzle having a spray rate of 8 GPM. Thus, the total spray rate from the spray head 12 is 11 GPM.

Figure 24:
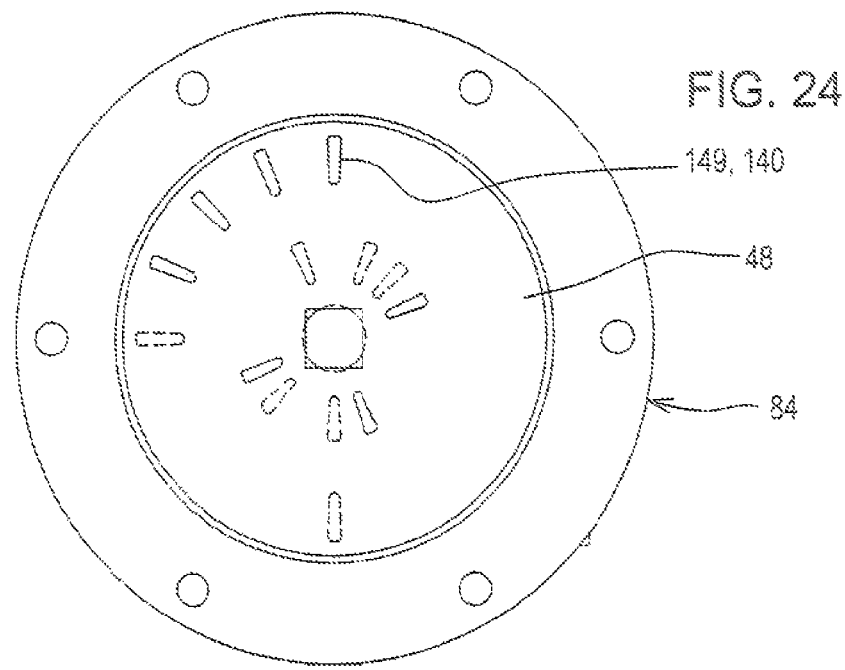

Position 12 of the selector disk 48 is achieved by indexing the selector disk 48 clockwise through an angle of 22.5° from the 247.5° position to a 270° position illustrated in FIG. 24 wherein the selector slot 149 of the selector disk 48 is superposed over the flow control slot 140 of the outlet section 84 of the manifold body 14. As described above, the flow control slot 140 is coupled in fluid communication with both outlets 124 and 126, these outlets respectively supplying fluid to the nozzles 36 and 38. The nozzle 36 has the spray tip 44 having the spray rate of 8 GPM, and the nozzle 38 has the spray tip 46 respectively having the spray rate of 4 GPM. Thus, the total spray rate from the spray head 12 is 12 GPM.

Figure 25:
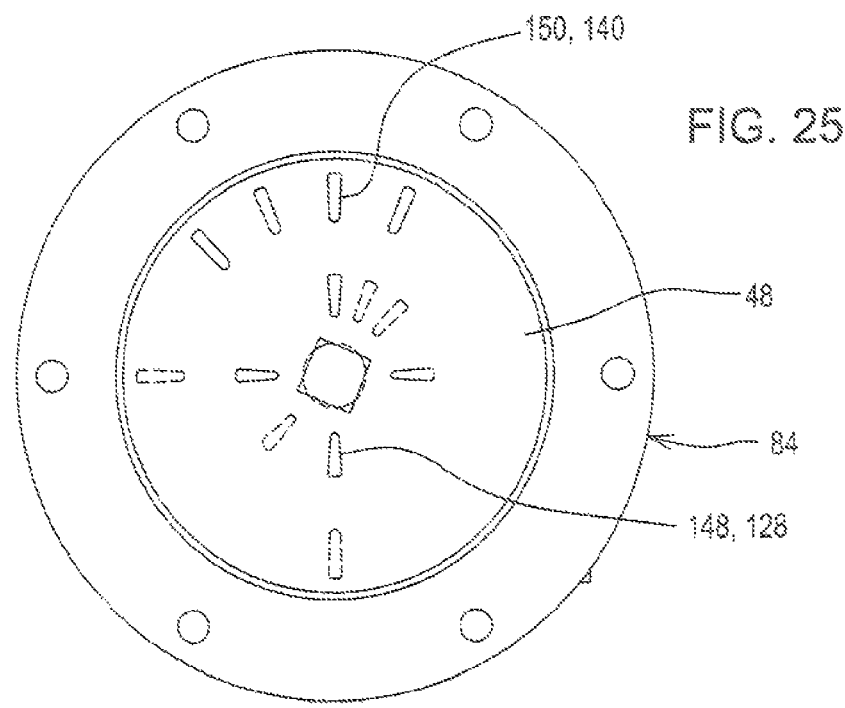

Position 13 of the selector disk 48 is achieved by indexing the selector disk 48 clockwise through an angle of 22.5° from the 270° position to a 292.4° position illustrated in FIG. 25 wherein the selector slots 148 and 150 of the selector disk 48 are respectively superposed over the flow control slots 128 and 140 of the outlet section 84 of the manifold body 14. As described above, the flow control slot 128 is coupled in fluid communication with the outlet 120 which supplies fluid to the nozzle 32 having the spray tip 40 having the spray rate of 1 GPM. The flow control slot 140 is connected in fluid communication with both of the outlets 126 and 124, with the outlet 126 supplying fluid to the nozzle 38 having the tip 46 which has the spray rate of 4 GPM and with the outlet 124 supplying fluid to the nozzle 36 having the tip 44 which has the spray rate of 8 GPM. Thus, the total spray rate from the spray head is 13 GPM.

Figure 26:
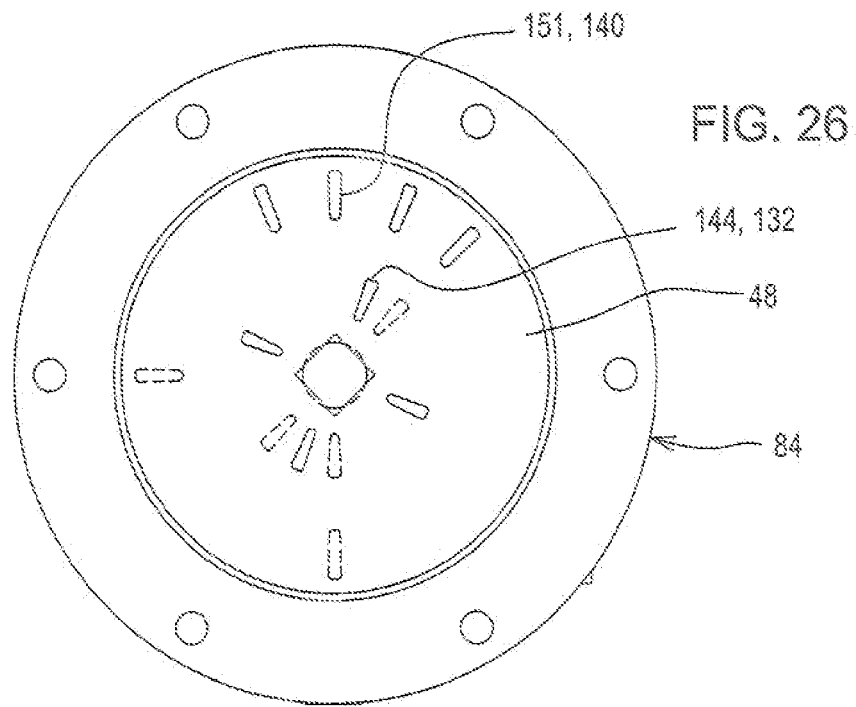

Position 14 of the selector disk 48 is achieved by indexing the selector disk 48 clockwise through an angle of 22.5° from the 292.5° position to a 215° position illustrated in FIG. 26 wherein the selector slots 144 and 151 of the selector disk 48 are respectively superposed over the flow control slots 132 and 140 of the outlet section 84 of the manifold body 14. As described above, the flow control slot 132 is coupled in fluid communication with the outlet 122 which supplies fluid to the nozzle 34 having the spray tip 42 having the spray rate of 2 GPM. The flow control slot 140 is connected in fluid communication with both of the outlets 126 and 124, with the outlet 126 supplying fluid to the nozzle 38 having the tip 46 which has the spray rate of 4 GPM and with the outlet 124 supplying fluid to the nozzle 36 having the tip 44 which has the spray rate of 8 GPM. Thus, the total spray rate from the spray head is 14 GPM.

Figure 27:
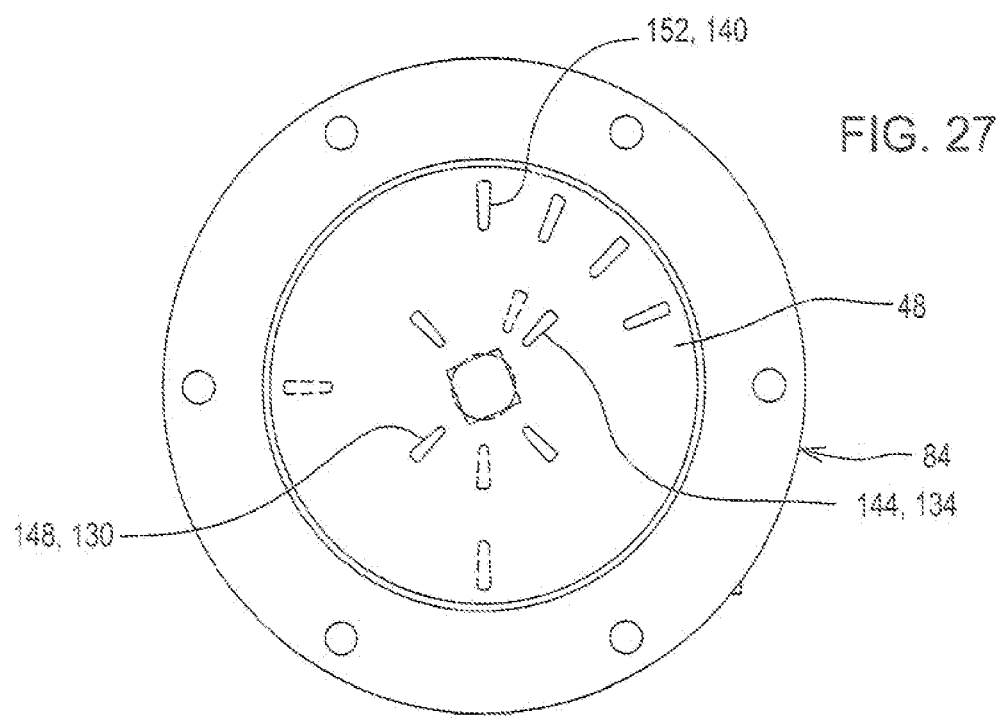

Position 15 of the selector disk 48 is achieved by indexing the selector disk 48 clockwise through an angle of 22.5° from the 215° position to a 237.5° position illustrated in FIG. 27 wherein the selector slots 144, 148 and 152 of the selector disk 48 are respectively superposed over the flow control slots 130, 134 and 140 of the outlet section 84 of the manifold body 14. As described above, the flow control slot 130 is coupled in fluid communication with the outlet 120 which supplies fluid to the nozzle 32 having the spray tip 40 having the spray rate of 1 GPM. The flow control slot 134 is connected in fluid communication with the outlet 122 which supplies fluid to the nozzle 34 having the spray tip 42 which has a spray rate of 2 GPM. The flow control slot 140 is connected in fluid communication with both of the outlets 126 and 124, with the outlet 126 supplying fluid to the nozzle 38 having the tip 46 which has the spray rate of 4 GPM and with the outlet 124 supplying fluid to the nozzle 36 having the tip 44 which has the spray rate of 8 GPM. Thus, the total spray rate from the spray head is 15 GPM.

It is to be understood that, while the nozzle selector disk 48 and flow direction control plate 50 are particularly suited for making it possible to sequentially select different ones or different combinations of the nozzles 32-38 for effecting eleven ever increasing spray rates, other selector disk control slot arrangements and outlet arrangements could be designed which would operate in accordance with the principles of the present invention to achieve satisfactory results for some spraying applications. Additionally, it is to be understood that, for some spray application rates, it might be expedient to provide selector disk control slot arrangements and outlet arrangements requiring the selector disk to be moved other tan sequentially among the "on" positions of the selector disk, even requiring the drive motor 52 to be reversed at times.

Having described the preferred embodiment, it will become apparent that various modifications can be made without departing from the scope of the invention as defined in the accompanying claims.

The invention claimed is:

1. A spray head in an agricultural sprayer including a spray boom carrying a plurality of said spray heads, comprising:
a manifold body defining a fluid chamber including a bottom section having a substantially planar top surface region containing a plurality of flow control openings having inlets arranged in a circular ring-shaped zone extending about an upright axis;
a plurality of nozzles respectively having inlets coupled for receiving fluid from said plurality of flow control openings;
a nozzle selector disk being located in said chamber and having a flat bottom surface engaged with said planar top surface region of said bottom section, said nozzle selector disk being mounted for rotation about said axis and containing at least one nozzle selection opening located for selectively registering with said flow control openings as said nozzle selector disk is rotated in said chamber;
a power-operated motor being connected for rotating said nozzle selector disk; and
wherein a selected spray rate of the nozzles is related to a speed of the agricultural sprayer.

2. The spray head, as defined in claim 1, wherein said plurality of flow control openings include at least one flow control opening located in a second circular ring-shaped zone located concentric to said first-mentioned ring-shaped zone; and said nozzle selector disk contains at least a second nozzle selection opening located for coming into register with said at least one flow control opening, with said plurality of flow control openings being so located relative to each other that inlets of at least two of said plurality of nozzles are simultaneously coupled for receiving fluid from said fluid chamber when said control disk is in a preselected location relative to said flow control openings.

3. The spray head, as defined in claim 1, wherein said plurality of nozzles comprise first, second, third and fourth nozzles.

4. The spray head, as defined in claim 3, wherein a spray tip capacity of the first nozzle, at a constant supply pressure, is n GPA, a spray tip capacity of the second nozzle is 2n GPM, a spray tip capacity of the third nozzle is 4n GPM and a spray tip capacity of the fourth nozzle is 8n GPA, with the plurality of nozzle selection openings being so located in the nozzle selector disk and the flow control openings being so located in an outlet section of the manifold body that by indexing the nozzle selector disk sequentially among sixteen given positions separated from each other by 22.5° results in the sum of the tip capacities of said first, second, third and four nozzles respectively increasing in sixteen equal increments from On GPM to 15n GPM.

5. The agricultural sprayer, as defined in claim 1, wherein said power-operated motor is an electric motor.

6. The agricultural sprayer, as defined in claim 5, wherein said electric motor is a stepper motor.

7. A spray head for an agricultural sprayer, comprising: a manifold body having an inlet coupled to a supply of spray fluid and a plurality of outlets respectively coupled to a plurality of nozzles mounted to the manifold body, with each nozzle being provided with a conventional spray tip having a given spray rate at a given constant spray vehicle ground speed; a nozzle selector disk being mounted in the manifold body in a location where the disk moves over control fluid inlets of a plurality of flow direction control passages respectively leading to said outlets; said nozzle selector disk containing a plurality of nozzle selector openings located for selectively placing said inlet in fluid communication with one or more of said flow direction control passages as the nozzle selector disk is sequentially rotated among equally spaced positions, with the combination of aligned flow direction control passages and selector openings being such that a sum of the outlet rates of the nozzles placed in fluid communication with the inlet at each equally spaced position sequentially increases; and a stepper motor being coupled to said nozzle selector disk for rotating said disk among said equally spaced positions.

8. A spray head for use with an agricultural sprayer, comprising: a manifold body having a supply fluid inlet adapted for connection to a supply of spray fluid, a fluid chamber connected in fluid communication with said inlet, and a fluid direction control passage arrangement connected in fluid communication with said fluid chamber; at least first, second and third spray nozzles being mounted to said manifold body and respectively including first, second and third spray tips having respective different first, second and third constant spray rates when the nozzles are supplied with a spray fluid at a predetermined constant pressure and are carried at a predetermined ground speed by a spray vehicle, with the spray tips being oriented for directing spray fluid in a downward direction from the manifold body; said control passage arrangement including a plurality of separate control fluid inlets coupled in fluid communication with said fluid chamber, and including first, second and third control fluid outlets respectively coupled to said first, second and third nozzles; a valve arrangement being located in said fluid chamber for controlling fluid flow between the supply fluid inlet and said plurality of control fluid inlets and including a valve member associated with said plurality of control fluid inlets and being mounted for rotation among eight angularly spaced positions including an "off" position and seven "on" positions; said spray rates being so chosen and said control passage arrangement being so designed that a sum of the spray rates from said first, second and third nozzles increases at equal increments as the valve member is rotated from said "off" position to the seven "on" positions; and a power-operated motor being coupled to said valve member for selectively rotating the valve member among said "on" and "off" positions.

9. The spray head, as defined in claim 8, wherein said valve member is a circular nozzle selector disk containing a plurality of nozzle selector openings located in continuous fluid communication with said fluid chamber and being so located relative to said plurality of control fluid inlets, that said disk permits fluid communication between said fluid chamber and said control fluid inlets only when certain ones of said plurality of nozzle selector openings are aligned with certain ones of said plurality of control fluid inlets when the disk is in one of the "on" positions.

10. The spray head, as defined in claim 9, wherein some of the plurality of nozzle selector openings are arranged in a first circular ring having the axis of rotation at its center, while a remainder of the plurality of nozzle selector openings are arranged in a second circular ring located outside said first circular ring; and said control fluid inlets including some located for becoming aligned with said some of the plurality of nozzle selector openings, and including a remainder located for becoming aligned with said remainder of the plurality of nozzle selector openings.

11. The spray head, as defined in claim 8, wherein said power-operated motor is an electric stepper motor.

12. The spray head, as defined in clam 8, wherein said power-operated motor is an electric stepper motor, and said eight angularly spaced positions are equally spaced, and said stepper motor being operable for moving the valve member sequentially among said "off" and "on" positions.

13. The spray head of claim 1, wherein the agricultural sprayer maintains a desired constant spray application rate when the speed varies.

14. The spray head of claim 1, wherein the agricultural sprayer includes a microprocessor coupled to the spray head, and wherein the microprocessor contains a look-up table of application rates for the nozzles.

15. The spray head of claim 1, wherein the agricultural sprayer includes a microprocessor coupled to the spray head, and wherein the microprocessor contains a look-up table of application rates for the nozzles relating to the speed of the agricultural sprayer.

16. The spray head of claim 1, wherein the agricultural sprayer includes a microprocessor coupled to the spray head, and wherein the microprocessor has a memory that stores a type of spraying and corresponding nozzle tip.

17. The spray head of claim 16, wherein a manually-operable data input device is coupled to the microprocessor, and wherein the type of spraying and corresponding nozzle tip are keyed in to the input device.

18. The spray head of claim 7, wherein the agricultural sprayer includes a microprocessor coupled to the spray head, and wherein the microprocessor contains a look-up table of application rates for the nozzles.

19. The spray head of claim 7, wherein the agricultural sprayer includes a microprocessor coupled to the spray head, and wherein the microprocessor has a memory that stores a type of spraying and corresponding nozzle tip.

20. The spray head of claim 19, wherein a manually-operable data input device is coupled to the microprocessor, and wherein the type of spraying and corresponding nozzle tip are keyed in to the input device.

* * * * *